(12) United States Patent
Nakanishi et al.

(10) Patent No.: US 7,534,513 B2
(45) Date of Patent: May 19, 2009

(54) MEMBRANE ELECTRODE ASSEMBLY FOR A TUBE-SHAPED FUEL CELL AND TUBE-SHAPED FUEL CELL

(75) Inventors: Haruyuki Nakanishi, Susono (JP);
Shigeaki Murata, Numazu (JP);
Hiroaki Hayashi, Chiryu (JP);
Masahito Hoshino, Nagoya (JP);
Kiyomi Kozuka, Ama-gun (JP)

(73) Assignees: Toyota Jidosha Kabushiki Kaisha, Toyota (JP); Tsuchiya Co., Ltd., Nagoya-shi (JP)

( * ) Notice: Subject to any disclaimer, the term of this patent is extended or adjusted under 35 U.S.C. 154(b) by 253 days.

(21) Appl. No.: 11/597,690

(22) PCT Filed: Jun. 9, 2005

(86) PCT No.: PCT/IB2005/001605

§ 371 (c)(1),
(2), (4) Date: Nov. 27, 2006

(87) PCT Pub. No.: WO2005/122303

PCT Pub. Date: Dec. 22, 2005

(65) Prior Publication Data

US 2007/0166589 A1    Jul. 19, 2007

(30) Foreign Application Priority Data

Jun. 11, 2004    (JP)    ............... 2004-174659

(51) Int. Cl.
*H01M 8/10* (2006.01)
(52) U.S. Cl. ............... 429/31; 429/40; 429/41; 429/44; 429/12
(58) Field of Classification Search ........... 429/31, 429/40, 41, 44, 12
See application file for complete search history.

(56) References Cited

U.S. PATENT DOCUMENTS

| | | | |
|---|---|---|---|
| 4,420,544 | A | 12/1983 | Lawson et al. |
| 5,458,989 | A | 10/1995 | Dodge |
| 5,916,514 | A | 6/1999 | Eshraghi |
| 5,928,808 | A | 7/1999 | Eshraghi |
| 5,989,300 | A | 11/1999 | Eshraghi |
| 6,004,691 | A | 12/1999 | Eshraghi |
| 6,338,913 | B1 | 1/2002 | Eshragi |
| 6,399,232 | B1 | 6/2002 | Eshraghi |

(Continued)

FOREIGN PATENT DOCUMENTS

JP    A 11-111313    4/1999

(Continued)

*Primary Examiner*—Laura S Weiner
(74) *Attorney, Agent, or Firm*—Oliff & Berridge, PLC (57) ABSTRACT

A membrane electrode assembly (11) for a tube-shaped fuel cell, which is provided with a tube-shaped solid electrolyte membrane (1); an outside catalyst electrode layer (2) formed on an outer peripheral surface of the solid electrolyte membrane (1); an inside catalyst electrode layer (3) formed on an inner peripheral surface of the solid electrolyte membrane (1); an outside collector (4) arranged on an outer peripheral surface of the outside catalyst electrode layer (2); and an inside collector (5) arranged on an inner peripheral surface of the inside catalyst electrode layer (3), is characterized in that at least one of the outside collector (4) and the inside collector (5) is a coiled collector that includes a coiled conductor.

4 Claims, 9 Drawing Sheets

U.S. PATENT DOCUMENTS

| | | |
|---|---|---|
| 6,403,248 B1 | 6/2002 | Eshraghi |
| 6,403,517 B1 | 6/2002 | Eshraghi |
| 6,444,339 B1 | 9/2002 | Eshraghi |
| 6,495,281 B1 | 12/2002 | Eshraghi |
| 2004/0028990 A1 | 2/2004 | Lewin et al. |

FOREIGN PATENT DOCUMENTS

| | | |
|---|---|---|
| JP | A 2001-229933 | 8/2001 |
| JP | A 2002-124273 | 4/2002 |
| JP | A 2002-260685 | 9/2002 |
| JP | A 2002-289220 | 10/2002 |
| JP | A 2002-539587 | 11/2002 |
| WO | WO 96/04690 A1 | 2/1996 |
| WO | WO 00/54358 A1 | 9/2000 |
| WO | WO 01/24300 A1 | 4/2001 |
| WO | WO 02/31901 A2 | 4/2002 |
| WO | WO 03/103079 A2 | 12/2003 |

MEMBRANE ELECTRODE ASSEMBLY FOR A TUBE-SHAPED FUEL CELL AND TUBE-SHAPED FUEL CELL

BACKGROUND OF THE INVENTION

1. Field of the Invention

The invention relates to a membrane electrode assembly for a tube-shaped fuel cell, which is used in a tube-shaped fuel cell, and a tube-shaped fuel cell, which can reduce costs and be made compact by being formed in a tube shape.

2. Description of the Related Art

A unit cell, which is the smallest power generating unit of a proton-exchange membrane fuel cell (PEMFC), typically has a membrane electrode assembly in which a catalyst electrode layer is joined to both sides of a solid electrolyte membrane. A gas diffusion layer is arranged on both sides of this membrane electrode assembly. Further, a separator having gas flow paths is arranged on the outside of the gas diffusion layer. Fuel gas and oxidant gas supplied the catalyst electrode layer of the membrane electrode assembly are then passed through the gas diffusion layers, and the electric current obtained by the power generated is then transmitted outside the cell.

The separator, which is sandwiched between the single cells, serves to prevent the fuel gas (e.g., hydrogen) entering the fuel electrode from mixing with the oxidant gas (e.g., air) entering the air electrode when cells are stacked together. The separator also acts as an electron conductor for connecting two cells together in series. A fuel cell which is used to generated power is made by stacking together the necessary number of single cells to assemble a fuel cell stack, and then integrating an apparatus to supply the fuel and oxidant gas, and a control apparatus, and the like.

With the structure of the proton-exchange membrane fuel cell (PEMFC) of the related art described above, however, a separator, i.e., a member used to both prevent the reaction gases between individual single cells from mixing and electrically connect the single cells together, is necessary. Because the solid polymer electrolyte membrane exhibits acidity due to the property of a sulfonic group, which is an ion-exchange group thereof, the separator must be both acid resistant and conductive. Therefore, carbon material or titanium material is used. These materials are both difficult to machine and costly, which increases the cost of the fuel cell main unit.

Also, in a flat fuel cell structure such as that described above, even if it were suited for a design in which a number of electrodes (i.e., fuel electrodes and air electrodes) with a large area are stacked up, the fuel cell could not be made compact. Thus, problems may occur in a case in which compactness is required, such as with a fuel cell to be mounted in a vehicle, for example.

In order to solve this kind of problem, a tube-shaped fuel cell has been proposed (see JP(A) 2002-289220, JP(A) 2002-124273, and JP(A) 2002-260685). This type of tube-shaped fuel cell does not require a separator and is therefore advantageous in that costs can be reduced and the fuel cell can be made compact.

In this type of tube-shaped fuel cell, however, it is necessary to have electrons that are generated flow in the axial direction of the tube. Unless a collector which is capable of making the electrons flow smoothly in the axial direction is provided, the efficiency will decrease.

Also, when attempting to form a collector using a tube-shaped conductor when attempting to form a membrane electrode assembly for a tube-shaped fuel cell using a solid electrolyte membrane which has been formed in a tube shape in advance, the dimensions for the outside diameter of the inside collector and the inside diameter of the outside collector must be extremely accurate. Further, in this case, the processes of mounting the inside collector and the outside collector are extremely troublesome and complicated.

In view of the foregoing problems, it is an object of the invention to provide a tube-shaped fuel cell and a membrane electrode assembly for a tube-shaped fuel cell that has a collector which has good power collecting efficiency in the axial direction of the tube, does not require high dimensional accuracy, and is relatively easy to mount.

SUMMARY OF THE INVENTION

In order to achieve the foregoing object, the invention thus provides a membrane electrode assembly for a tube-shaped fuel cell (hereinafter, also referred to as "membrane electrode assembly") provided with a tube-shaped solid electrolyte membrane; an outside catalyst electrode layer formed on an outer peripheral surface of the solid electrolyte membrane; an inside catalyst electrode layer formed on an inner peripheral surface of the solid electrolyte membrane; an outside collector arranged on an outer peripheral surface of the outside catalyst electrode layer; and an inside collector arranged on an inner peripheral surface of the inside catalyst electrode layer, the membrane electrode assembly being characterised in that at least one of the outside collector and the inside collector is a coiled collector that includes a coiled conductor.

According to the invention, at least one of the outside collector and the inside collector is a coiled collector that includes a coiled conductor. As a result, the power collecting function in the axial direction of the tube is high. Moreover, the inside and outside diameters of the coil can be changed by twisting the coil, thus making it easier to mount as a collector. Further, the shape does not have to be that accurate. In addition, because it was mounted using the method described above, after mounting, tightening force is applied to the inside with the outside collector, and expanding force is applied to the outside with the inside collector, both of which increase contact with the catalyst electrode layer, thereby enabling extremely high power collection efficiency to be maintained.

Also, both the outside collector and the inside collector may use a coiled collector which includes a coiled conductor.

Further, the membrane electrode assembly for a tube-shaped fuel cell according to the invention may be used in a tube-shaped fuel cell which uses a tube-shaped solid electrolyte membrane, and may be formed by a coiled wire rod made of a metal that is resistant to corrosion.

Also, in the membrane electrode assembly for a tube-shaped fuel cell according to the invention, at least one of the outside collector and the inside collector may be integrated with a catalyst electrode layer.

Furthermore, a tube-shaped fuel cell according to the invention may use the membrane electrode assembly for a tube-shaped fuel cell described above.

Because it uses the membrane electrode assembly for a tube-shaped fuel cell described above, the tube-shaped fuel cell according to the invention is advantageous in that it is both inexpensive and has excellent power generating efficiency because of the good power collecting efficiency in the axial direction of the tube.

With the membrane electrode assembly for a tube-shaped fuel cell according to the invention, the power collecting function in the axial direction of the tube is high and it is easy to mount the collector during production. Furthermore, the shape of the collector does not need to be that accurate. Thus, the membrane electrode assembly according to the invention is advantageous in that it makes it possible to improve the power generating efficiency of a fuel cell which uses the membrane electrode assembly, and it can be made inexpensive.

DETAILED DESCRIPTION OF THE PREFERRED EMBODIMENTS

The invention includes a membrane electrode assembly for a tube-shaped fuel cell, a collector for a tube-shaped fuel cell, and a tube-shaped fuel cell. Each of these will be described in detail hereinafter.

A. Membrane Electrode Assembly for Tube-shaped Fuel Cell

1. First Embodiment

The membrane electrode assembly for tube-shaped fuel cell according to a first exemplary embodiment of this invention is a membrane electrode assembly for a tube-shaped fuel cell, which is provided with a tube-shaped solid electrolyte membrane; an outside catalyst electrode layer formed on an outer peripheral surface of the solid electrolyte membrane; an inside catalyst electrode layer formed on an inner peripheral surface of the solid electrolyte membrane; an outside collector arranged on an outer peripheral surface of the outside catalyst electrode layer; and an inside collector arranged on an inner peripheral surface of the inside catalyst electrode layer. The membrane electrode assembly is characterised in that at least one of the outside collector and the inside collector is a coiled collector that includes a coiled conductor.

Figure 1A:
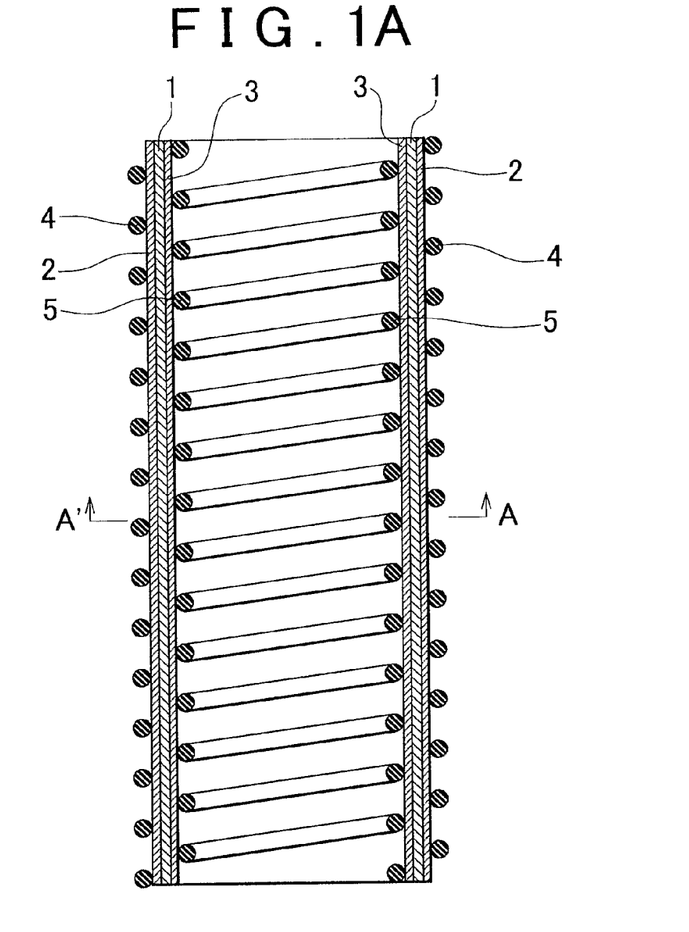
FIG. 1 is a block diagram schematically showing one example of a membrane electrode assembly according to the invention.
Figure 1B:
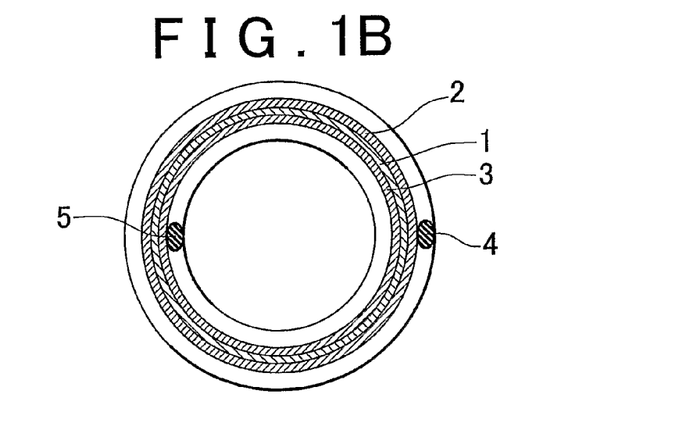

FIG. 1 is a view showing an example of a membrane electrode assembly according to this exemplary embodiment, with FIG. 1(a) being a vertical sectional view of a cross-section, in the axial direction, of a tube-shaped membrane electrode assembly and FIG. 1(b) being a horizontal sectional view of a cross-section (taken along line A-A') in the circumferential direction. As shown in FIG. 1, the membrane electrode assembly of this example includes a tube-shaped solid electrolyte membrane 1; an outside catalyst electrode layer 2 formed on an outer peripheral side of the solid electrolyte membrane 1; an inside catalyst electrode layer 3 formed on an inner peripheral side of the solid electrolyte membrane 1; an outside collector 4 made of a coiled wire rod arranged on an outer peripheral surface of the outside catalyst electrode layer 2; and an inside collector 5 made from a coiled wire rod arranged on an inner peripheral surface of the inside catalyst electrode layer 3.

The membrane electrode assembly of this exemplary embodiment has the following great advantages because it uses coiled collectors made from coiled wire rods for the collectors in this way.

First, because each collector is made from a single coiled wire rod that extends from one end portion to the other end portion in the axial direction, the power collecting efficiency in the axial direction is extremely good, which enables power generating efficiency to be improved when used in a fuel cell.

Further, because the collector is coil shaped, when it is used as the inside collector, for example, the outside diameter of the coil can be decreased by twisting the coil in the closing direction (i.e., against the spring force). As a result, when mounting the coiled collector, the collector can be inserted to the inside of the catalyst electrode layer after the outside diameter of the collector has been reduced in this way, which is advantageous in that it makes mounting extremely easy. Also, by adjusting the twisting angle, the outside diameter of the coiled collector can be changed to some degree. Therefore the outside diameter of the coiled collector does not have to be that accurate, which makes it possible to reduce the cost.

Moreover, when the coiled collector is then returned to its original state, force is applied in the direction in which the outside diameter of the coiled collector expands, thereby fixing the coiled collector in a state in which it is pushing with a predetermined reaction, force against the inside catalyst electrode layer. As a result, power collecting efficiency is able to be kept extremely high, which enables power generating efficiency to be increased when it is used in a fuel cell.

When a coiled collector is used for the outside collector, on the other hand, the inside diameter of the coil can be made larger by twisting the coil in the loosening direction (i.e., the direction in which is expands). As a result, when mounting the coiled collector, the coiled collector can be mounted to the outer peripheral surface of the outside catalyst electrode layer after the inside diameter of the collector has been enlarged in this way, i.e., the laminated body in which the outside catalyst electrode layer is formed on the outer peripheral surface of the tube-shaped solid electrolyte membrane can be inserted into the inner portion of the coiled collector, which is advantageous in that it makes mounting extremely easy. Also, by adjusting the twisting angle, the inside diameter of the coiled collector can be changed to some degree. Therefore the inside diameter of the coiled collector does not have to be that accurate, which makes it possible to reduce the cost.

Also, when the coiled collector is then returned to its original state, force is applied in the direction in which the inside diameter of the coiled collector decreases, thereby fixing the coiled collector in a state in which it is pushing with a predetermined reaction force against the outside catalyst electrode layer. As a result, power collecting efficiency is able to be kept extremely high, which enables power generating efficiency to be increased when it is used in a fuel cell.

The respective structures of this type of membrane electrode assembly will hereinafter be described in detail.

(1) Coiled Collector

The coiled collector used in this exemplary embodiment is not particularly limited as long as it has a conductive wire rod that is formed in a coil shape. However, considering the environment in which it is to be used, it is preferable that the coiled collector have good resistance to corrosion and that it not adversely affect the reaction in the catalyst electrode layer. Also, because it is preferable that the coiled collector be able to push against the catalyst electrode layer with a predetermined force after it is mounted by a mounting method such as that described above, the coiled collector preferably has some degree of elasticity. Considering these points, a metal which is resistant to corrosion is preferable. In particular, titanium, gold, and platinum, and the like are preferable materials. Of these, titanium is the preferable material in terms of cost.

This kind of coiled collector can also be used for only the outside collector or only the inside collector. However, a structure in which both the outside collector and the inside collector are coiled collectors is preferable.

(2) Solid Electrolyte Membrane

Next, the solid electrolyte membrane used in the exemplary embodiment will be described. The solid electrolyte membrane used in this invention is not particularly limited as long as it is tube shaped and of a material which has excellent proton conductivity and through which current is unable to flow.

More specifically, examples of a current solid electrolyte membrane of a fuel cell of a flat structure include a general-purpose fluorinated resin such as a perfluorosulfonic acid polymer (proprietary trade name: Nafion™ by Dupont) or the like, and a hydrocarbon resin, such as polyimide which has a proton conducting group, formed into a tube shape, and the like.

Also, examples of an inorganic solid electrolyte membrane include a tube-shaped solid electrolyte membrane in which porous glass is formed into a tube shape, the surfaces inside the nano-holes are reformed, and it is given proton conductivity, and a solid electrolyte membrane to which a tube-shaped phosphoric acid glass has been applied. Examples of the solid electrolyte membrane using the porous glass described above include a solid electrolyte membrane obtained by a method of introducing a sulfonic group having proton conductivity, by of reacting a silane coupling agent of mercaptopropyl trimetoxysilan with an OH group of an inside surface of the holes in the porous glass, and then oxidizing the —SH of the mercapto group, for example (Chemical and Chemical Industry JP, Vol. 57, No. 1 (2004), pp. 41 to 44), and the like. Also, an example of a solid electrolyte membrane to which phosphoric acid glass has been applied includes an example disclosed in Fuel Cell Vol. 3, No. 3, 2004, pp. 69 to 71.

(3) Outside Catalyst Electrode Layer and Inside Catalyst Electrode Layer

Lastly, the outside catalyst electrode layer and the inside catalyst electrode layer used in this exemplary embodiment will be described. The catalyst electrode layers used in this exemplary embodiment can be the same as the catalyst electrode layers that are used for a normal membrane electrode assembly for a fuel cell having a flat structure. More specifically, the catalyst electrode layers include a proton conducting material such as a perfluorosulfonic acid polymer (proprietary trade name: Nafion™ by Dupont) or the like, a conductive material such as carbon black or carbon nanotube, and a catalyst such as platinum carried on that conductive material.

2. Membrane Electrode Assembly for a Tube-shaped Fuel Cell

Figure 2:
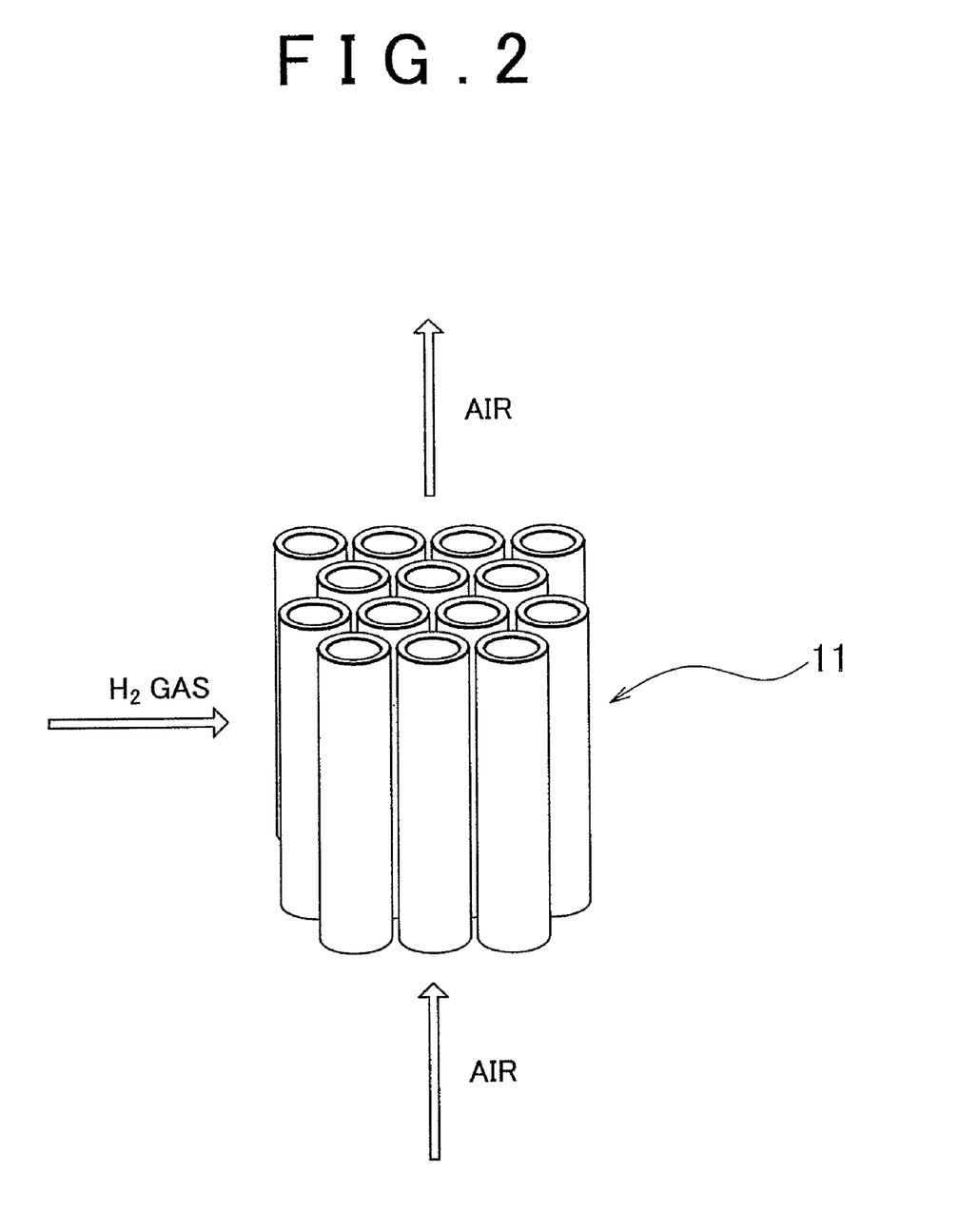
FIG. 2 is a perspective view schematically showing an example of how the membrane electrode assembly according to the invention is used.

The membrane electrode assembly for a tube-shaped fuel cell according to this invention is used as a fuel cell by arranging a plurality of the membrane electrode assemblies 11 for a tube-shaped fuel cell in lines and passing air through the insides of the inside collectors and hydrogen gas around the outside of the outside collectors, as shown in FIG. 2, for example, or conversely, passing hydrogen gas through the inside of the inside collectors and air around the outside of the outside collectors, which is opposite that shown in FIG. 2, while the inside collectors (not shown) and outside collectors (also not shown) of the membrane electrode assemblies 11 for a tube-shaped fuel cell are all connected to external terminals.

B. Collector for a Tube-shaped Fuel Cell

Next, a collector for a tube-shaped fuel cell according to the invention will be described. The collector for a tube-shaped fuel cell according to the invention is characterised in that it is used in a tube-shaped fuel cell which uses a tube-shaped solid electrolyte membrane and is formed by a coiled wire rod made of a metal that is resistant to corrosion.

The collector for a tube-shaped fuel cell of this invention is the same as that described as the "coiled collector" under the section "Membrane electrode assembly for a tube-shaped fuel cell" above so a description thereof will be omitted.

C. Tube-shaped Fuel Cell

Lastly, the tube-shaped fuel cell of the invention will be described. The tube-shaped fuel cell of the invention is characterised in that it uses a membrane electrode assembly for a tube-shaped fuel cell such as that described above.

Such a tube-shaped fuel cell of the invention will hereinafter be described with reference to the drawings.

Figure 3:
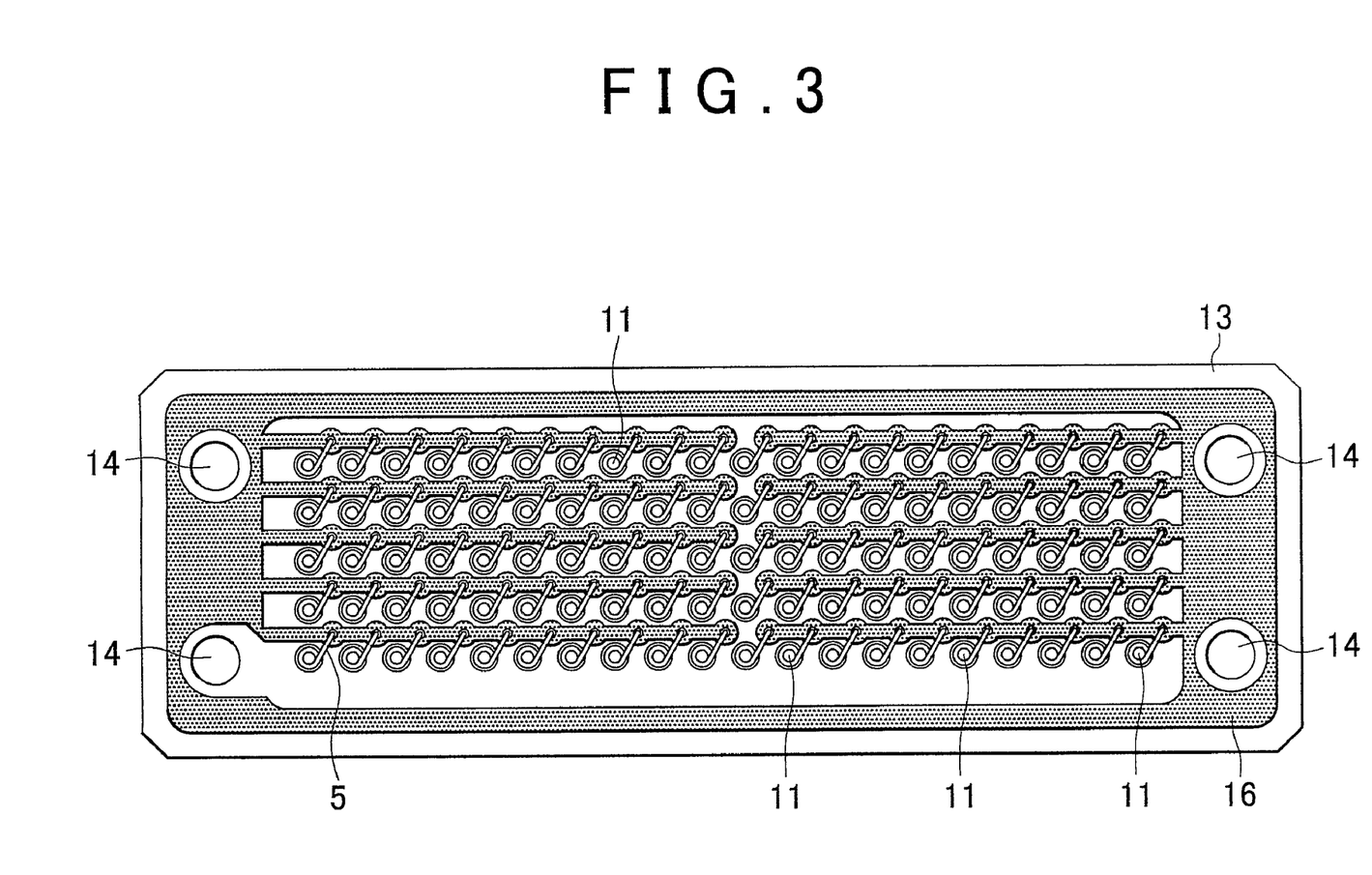
FIG. 3 is a plan view showing an example of a fuel cell according to the invention.
Figure 4:
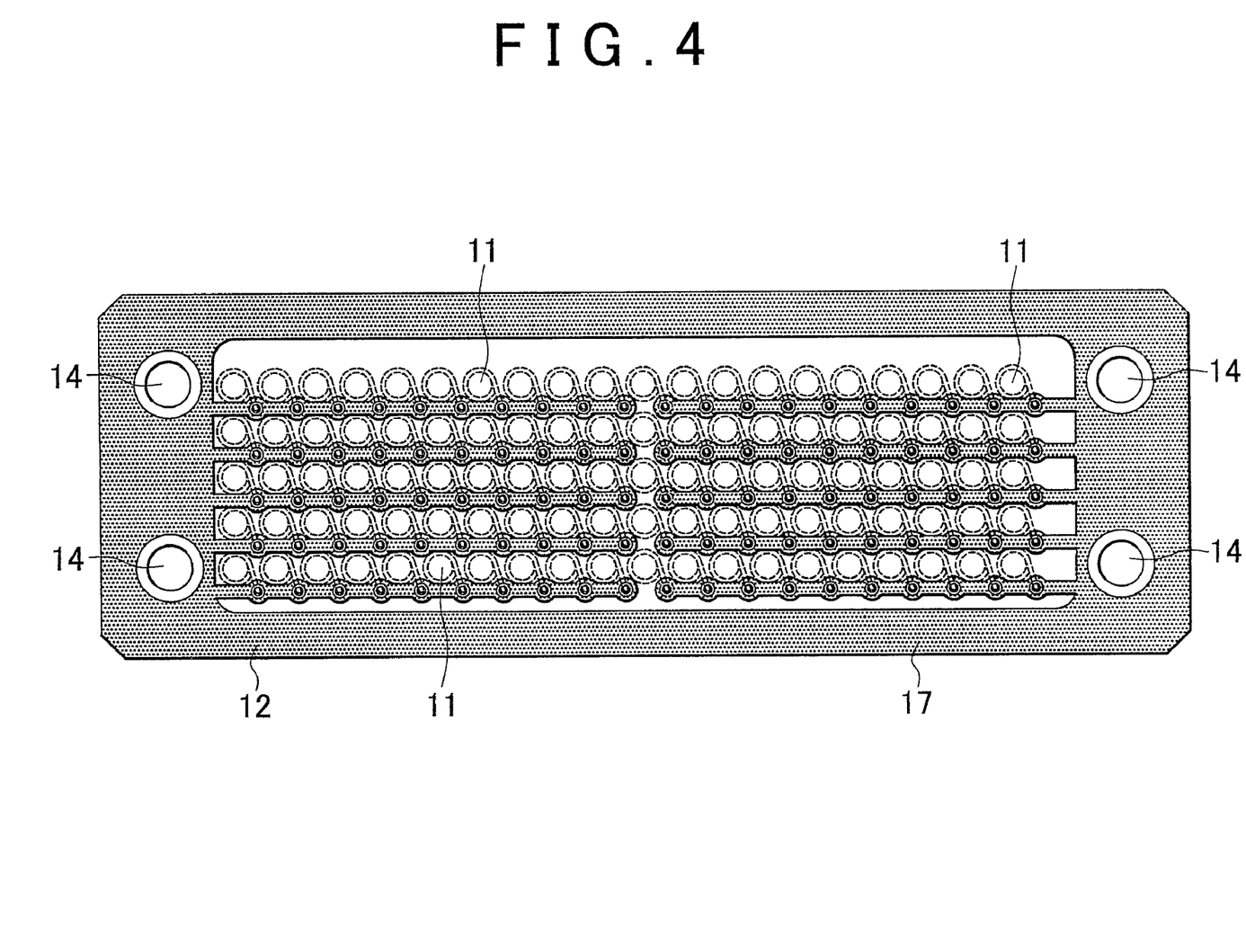
FIG. 4 is a bottom view showing the example of a fuel cell according to the invention.
Figure 5:
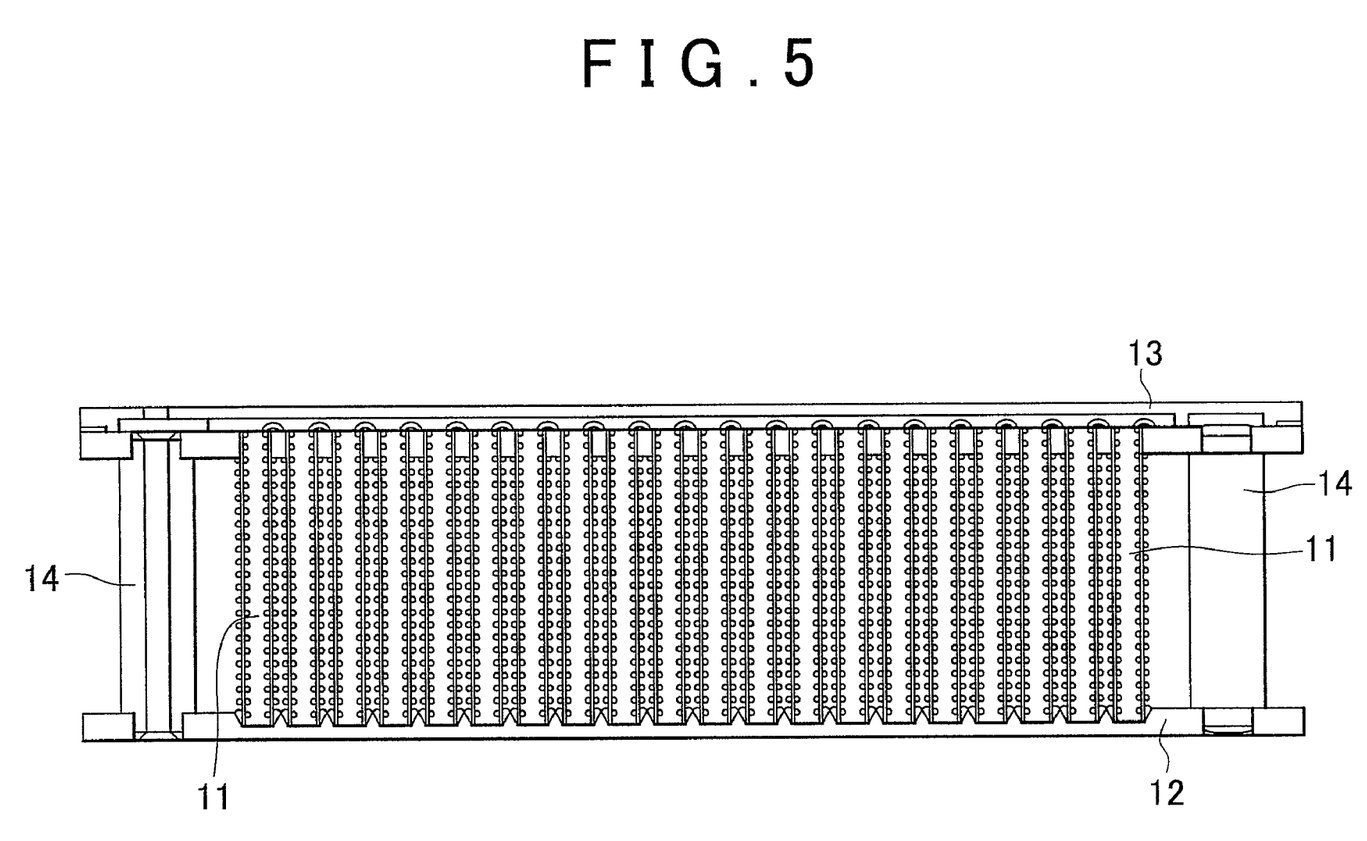
FIG. 5 is a sectional view showing the example of a fuel cell according to the invention.

FIGS. 3, 4, and 5 show an example of the tube-shaped fuel cell of the invention, with FIG. 3 being a top view, FIG. 4 being a bottom view, and FIG. 5 being a sectional view. This example shows a tube-shaped fuel cell which uses the coiled collector for both the inside collector and the outside collector. As shown in FIGS. 3 to 5, the tube-shaped fuel cell of this example is such that a plurality of the membrane electrode assemblies 11 for a tube-shaped fuel cell are erected parallel with one another between a lower support plate 12 and an upper support plate 13, and supports 14 which connect and support the lower support plate 12 and the upper support plate 13 are arranged at the four corners.

Figure 6:
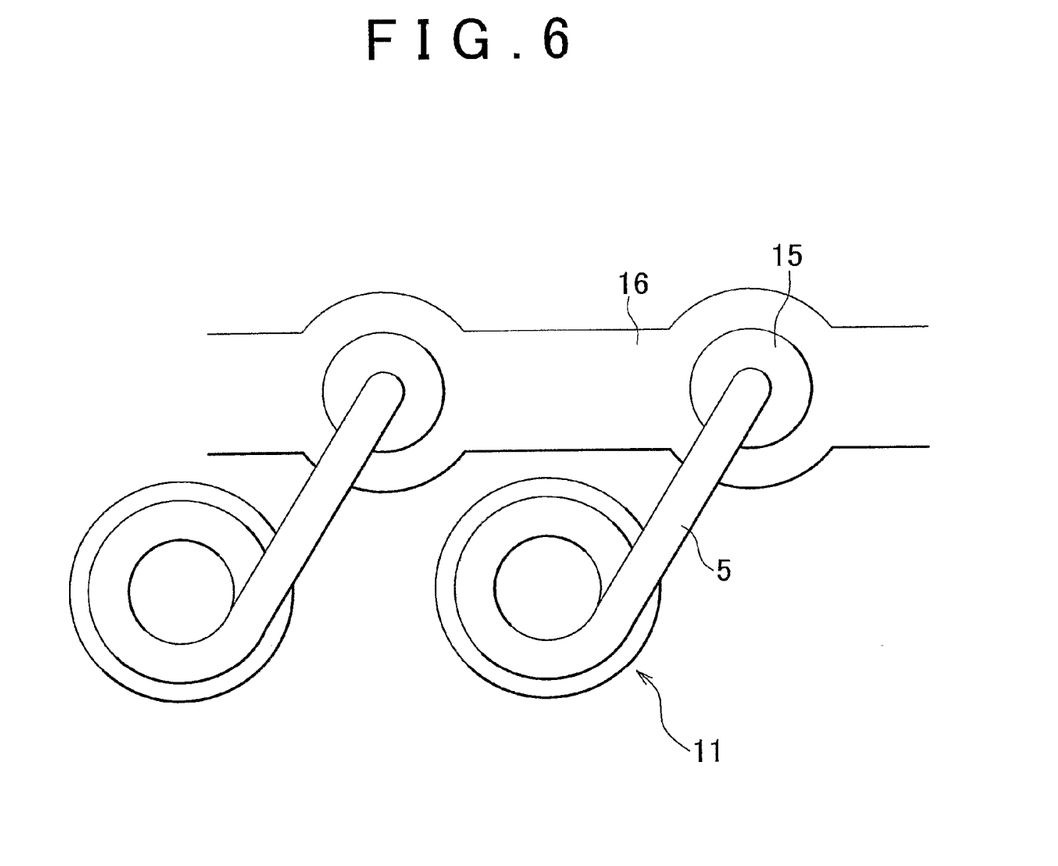
FIG. 6 is a plan view showing the connection of a terminal and an inside collector on an upper support plate of the fuel cell according to the invention.
Figure 7:
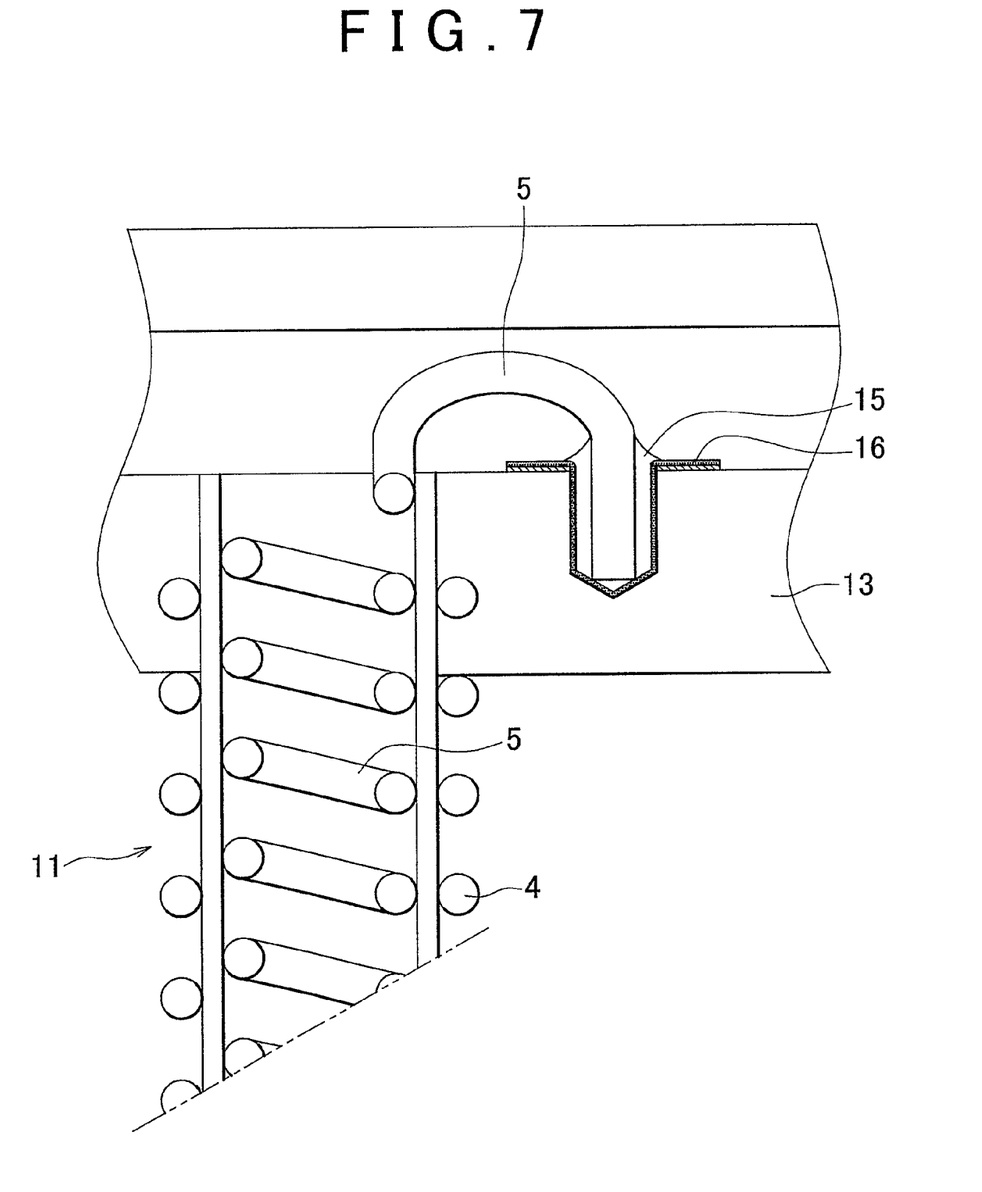
FIG. 7 is a sectional view showing the connection of the terminal and the inside collector on the upper support plate of the fuel cell according to the invention.
Figure 8:
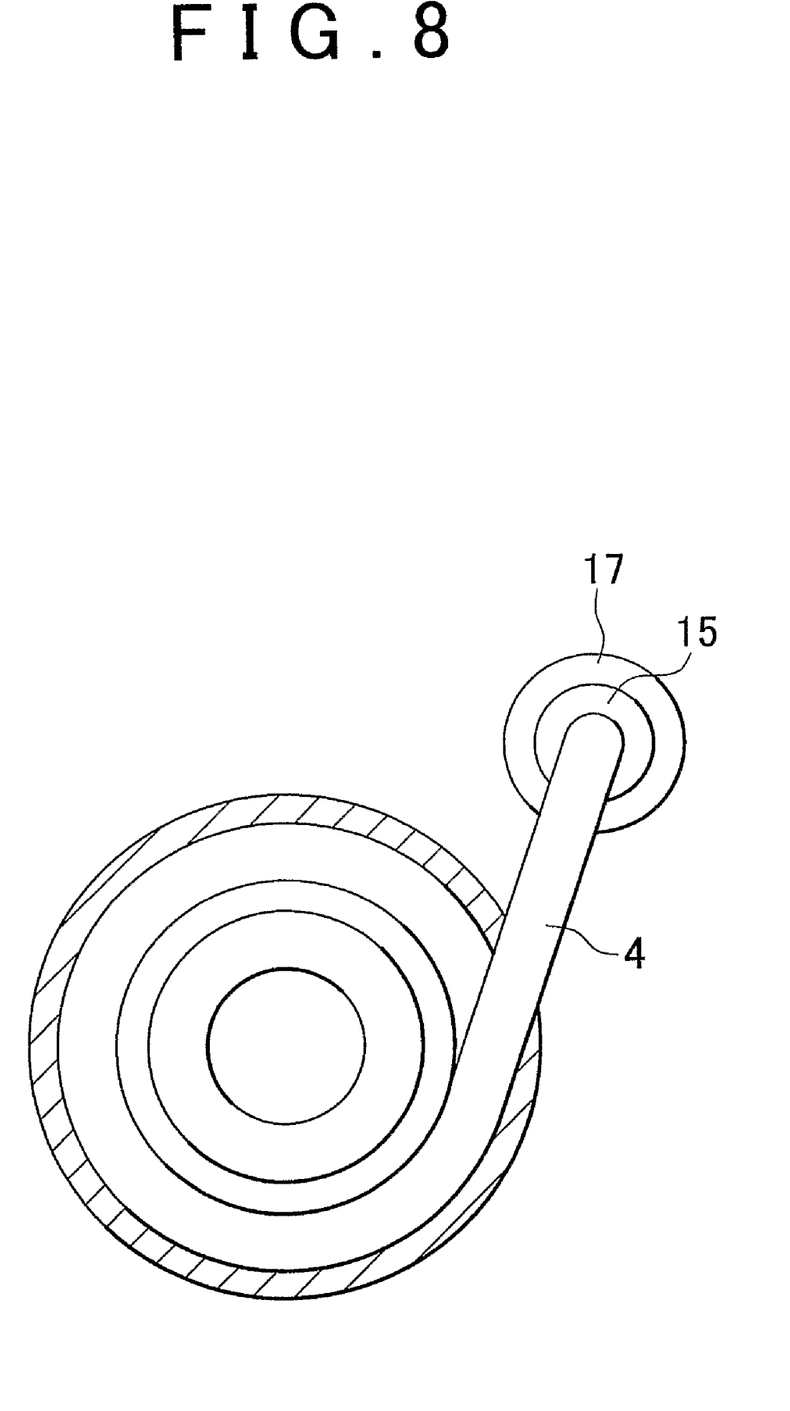
FIG. 8 is a plan view showing the connection of a terminal and an outside collector on a lower support plate of the fuel cell according to the invention.
Figure 9:
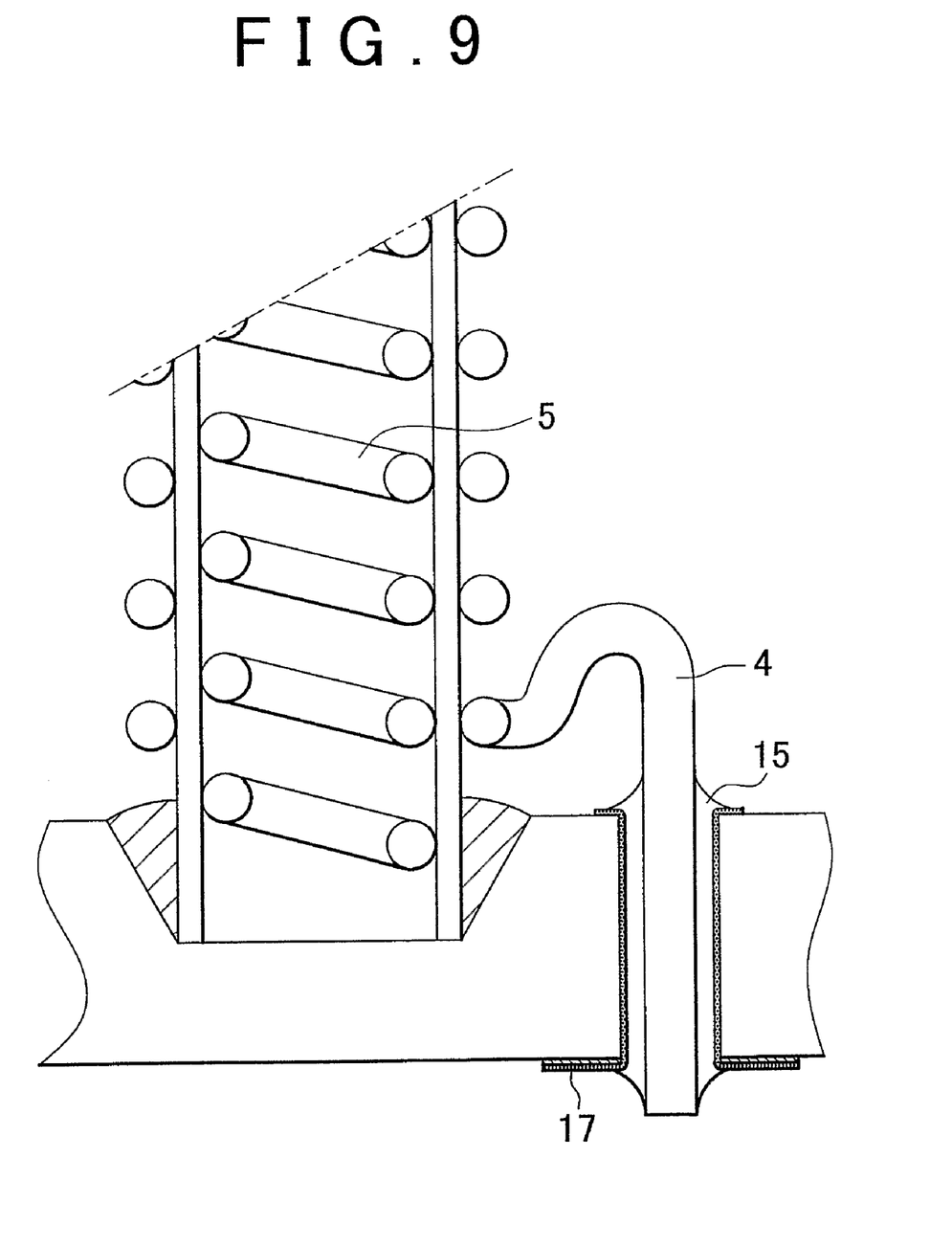
FIG. 9 is a sectional view showing the connection of the terminal and the outside collector on the lower support plate of the fuel cell according to the invention.

At the upper support plate 13 of the tube-shaped fuel cell, inside collectors 5 of the membrane electrode assemblies 11 for a tube-shaped fuel cell are connected to an upper terminal 16 via soldering 15 at the upper ends of the inside collectors 5, as shown in FIGS. 6 and 7. At the lower support plate 12, outside collectors 4 of the membrane electrode assemblies 11 for a tube-shaped fuel cell are connected to a lower terminal 17 via soldering 15 at the lower ends of the outside collectors 4, as shown in FIGS. 8 and 9.

In the tube-shaped fuel cell shown in this example, hydrogen gas is supplied to the inside and air is supplied to the outside of the membrane electrode assemblies 11 by gas supplying means, not shown. As a result, electrons are supplied to the inside collector 5 side such that the upper terminal 16 to which the inside collectors 5 are connected is used as the negative electrode and the lower terminal 17 to which the outside collectors 4 are connected is used as the positive electrode.

The tube-shaped fuel cell of this invention has good power collecting efficiency because it has a membrane electrode assembly in which a coiled collector such as that described above is used for both the outside collector and the inside collector, and the membrane electrode assembly provides good contact between the collectors and the catalyst electrode layers. Thus, the tube-shaped fuel cell of this invention, which has a plurality of this kind of membrane electrode assembly, has extremely good power generating efficiency.

The invention is not limited to the foregoing exemplary embodiment. The exemplary embodiment is merely an example. Any and all various modifications and equivalent arrangements which have a structure that is essentially the same as the technical aspects disclosed in the scope of the claims for patent of this invention and which display the same operation and effects are within the technical scope of the invention.

For example, in the foregoing description, the outside catalyst electrode layer and the outside collector, and further, the inside catalyst electrode layer and the inside collector, are described as different structures. However, the invention also covers a structure in which the collectors and the catalyst electrode layers are integrated and which has both functions, such as in a case in which a carbon tube that carries a catalyst is formed on the collector itself.

The invention claimed is:

1. A membrane electrode assembly for a tube-shaped fuel cell, comprising:
   a tube-shaped solid electrolyte membrane;
   an outside catalyst electrode layer formed on an outer peripheral surface of the solid electrolyte membrane;
   an inside catalyst electrode layer formed on an inner peripheral surface of the solid electrolyte membrane;
   an outside collector arranged on an outer peripheral surface of the outside catalyst electrode layer; and
   an inside collector arranged on an inner peripheral surface of the inside catalyst electrode layer,
   wherein:
   at least one of the outside collector and the inside collector is a twisted coiled collector mounted to the respective catalyst electrode layer, and
   the outside collector and the inside collector are both coiled collectors each of which includes a coiled conductor.

2. The membrane electrode assembly for a tube-shaped fuel cell according to claim 1, wherein at least one of the outside collector and the inside collector is integrated with the catalyst electrode layer.

3. The membrane electrode assembly for tube-shaped fuel cell according to claim 1, wherein at least one of the outside collector and the inside collector is a metal that is resistant to corrosion.

4. A tube-shaped fuel cell characterised in that it uses the membrane electrode assembly for a tube-shaped fuel cell according to claim 1.

* * * * *